United States Patent [19]

Marshall

[11] 4,151,318

[45] Apr. 24, 1979

[54] LAMINAR THERMOPLASTIC FILM CONSTRUCTIONS

[75] Inventor: Jeffrey D. Marshall, Palmyra, N.Y.

[73] Assignee: Mobil Oil Corporation, New York, N.Y.

[21] Appl. No.: 698,388

[22] Filed: Jun. 21, 1976

[51] Int. Cl.² ............... B65D 31/00; B65D 77/00; B32B 27/08

[52] U.S. Cl. ...................................... 428/35; 428/36; 428/212; 428/516; 428/520; 428/910; 229/53; 229/55; 156/229; 264/176 R

[58] Field of Search ................... 428/36, 35, 212, 516, 428/520, 910; 229/53, 55; 156/229

[56] References Cited

U.S. PATENT DOCUMENTS

| | | | |
|---|---|---|---|
| 3,508,944 | 4/1970 | Henderson et al. | 428/516 |
| 3,857,754 | 12/1974 | Hirata et al. | 428/35 |
| 3,878,033 | 4/1975 | Zavasnik | 428/516 |
| 3,900,635 | 8/1975 | Funderburk et al, | 428/516 |
| 3,926,706 | 12/1975 | Reifenhauser et al. | 156/229 |
| 3,931,449 | 1/1976 | Hirata et al. | 428/35 |

Primary Examiner—P. C. Ives
Attorney, Agent, or Firm—Charles A. Huggett; James D. Tierney

[57] ABSTRACT

Laminar thermoplastic film constructions comprising a layer of low density polyethylene bonded to a layer of a dissimilar polymer or blend of polymers including high density polyethylene; blends of high density polyethylene copolymers and fractional melt index low density polyethylene; and blends of high density polyethylene with an ethylene vinyl acetate copolymer and fractional melt index low density polyethylene. Such laminates are particularly suitable for bag constructions.

2 Claims, 1 Drawing Figure

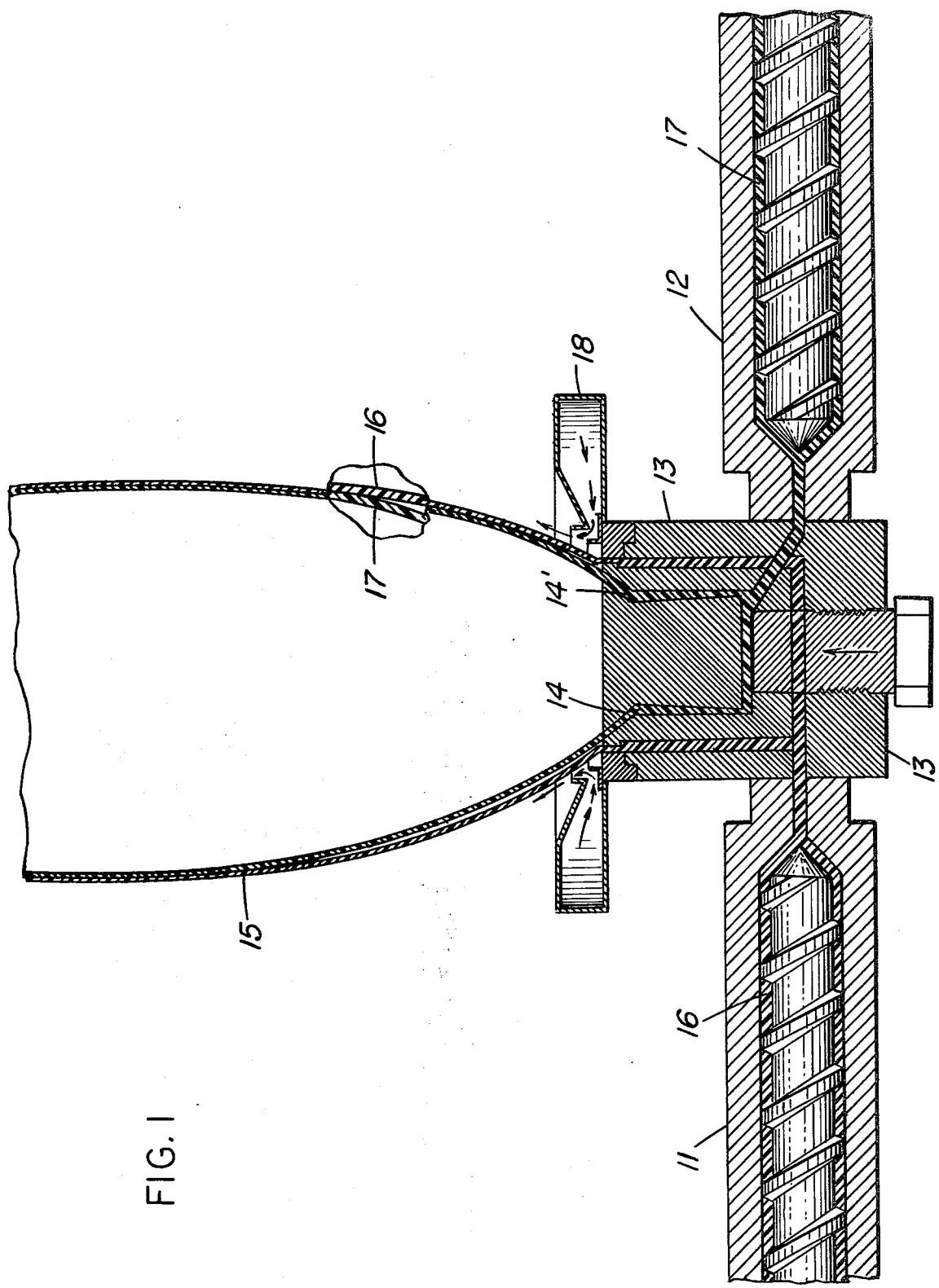

LAMINAR THERMOPLASTIC FILM CONSTRUCTIONS

DESCRIPTION OF THE PRIOR ART

Thermoplastic bags, and in particular polyethylene bags, have in recent years gained prominence in the packaging of a wide variety of goods such as dry goods, comestibles and the like. Most recently, polyethylene bags have emerged as the preferred packaging material for refuse materials and, in fact, many communities across the country have mandated that refuse be packaged and contained in such a manner. The advantages offered are obvious and include a hygenic means for the containment of garbage and waste materials; the bag provides some protection of the contents from insects, ruminants and other animals which would normally be attracted by the bag contents. Such bags are conventionly employed as disposable liners for trash cans whereby when the trash containers has been filled to capacity, the bag mouth is gathered and twisted closed and raised out of the container, leaving the interior of the container free from contamination and ready to receive another bag liner. The twisted bag mouth may be secured in a conventional manner employing wire-twistems or similar fasteners and subsequently the closed, loaded bag is disposed of. Alternately, such bags may be employed in an unsupported condition as receptacles. Prior are polyethylene bags however lack stiffness and when articles are loaded into such bags difficulties are encountered in keeping the bag mouth open, requiring excessive digital manipulation.

One of the most common drawbacks in the employment of polyethylene bags in waste disposal is their tendency to rupture under load stresses and, also, their fairly low puncture resistance. When a loaded bag is punctured, by an internal or external element, it is characteristic of the polyethylene film to zipper, i.e. the puncture tear rapidly propagates across the bag wall.

Numerous attempts have been made in the past to remedy the aforenoted deficiencies, the most obvious being to increase the film gauge, i.e. make the bag walls thicker and therefore stronger. However, substantial gauge increases are necessary to achieve substantial bag strengthening, on the order of 50% to 150%, and the product costs are increased in direct proportion to the increased resin employed in each bag. Attempts to replace the relatively low cost polyethylene with other resins which exhibit improved strength characteristics have been largely unsuccessful also for reasons of unfavorable economies associated with the more costly resin substitutes.

SUMMARY OF THE INVENTION

In accordance with the present invention it has been found that thermoplastic film structures which contain a predominant amount of relatively low cost resinous materials commonly used in the prior art fabrication of bags such as, for example, general purpose, low density polyethylene resin may be fabricated into articles such as bags which have improved strength characteristics over prior art polyethylene bags. In general it has been found that a laminar structure comprising at least one layer of low density, general purpose polyethylene resin having a thickness on the order of from about 60% to 90% and preferably from about 60% up to about 80% of the overall laminate thickness may be bonded to a second layer, the second layer contributing the balance of the overall laminate thickness, of a resin or blend of resins which comprises either a single polymer or in some cases a blend of polymeric resins. For example, the second layer may be constituted by a relatively thin layer of medium or high density polyethylene resin. Conversely, the second layer may constitute a blend of resinous material such as, for example, a blend of high density polyethylene, low density polyethylene and an ethylenevinyl acetate copolymer, or a blend of low density polyethylene and high density polyethylene copolymers including high density polyethylene which has been copolymerized with minor amounts of octene on the order of from about 2% up to about 5% by weight of octene. It has been found that when structures such as bags are fabricated from such laminar film materials, the low density polyethylene layer preferably constituting the interior bag surface, such bag structure offer improved strength characteristics as contrasted to the aforedescribed prior art non-laminar bag structures. Additionally, such strength characteristics are achieved by not sacrificing material economics as hereinabove discussed since the laminar bag structure of the present invention contain a predominant amount, i.e. up to about 80% of the overall laminar thickness, of low cost general purpose polyethylene resin.

BRIEF DESCRIPTION OF THE DRAWING

The FIGURE is a schematic side elevation, in cross section, of an extrusion apparatus employed for the production of the laminar films of the present invention, with certain segments enlarged for clarity.

DESCRIPTION OF SPECIFIC EMBODIMENTS

Numerous techniques have been described in the prior art for the formation of multilayer laminar thermoplastic film constructions including preforming a first film and subsequently melt extruding another film onto its surface whereby a two layer laminate is formed. Other techniques which have been developed in more recent years include a technique which is referred to as coextrusion, a process whereby molten or semi-molten layers of different polymers melts are brought into contact and subsequently cooled. Examples of such coextrusion techniques are described in U.S. Pat. Nos. 3,508,944 and 3,423,010. Although any of the aforedescribed techniques may be suitable in formation of the laminar structures of the present invention a particularly preferred technique is to produce the present laminates by extrusion of separate polymer melts from tubular die orifices which are concentric causing the separate molten or semi-molten streams to be extruded coaxially and then merged together outside of the die orifices whereby upon subsequent cooling a tubular laminate is produced. An example of such concentric extrusion of dissimilar thermoplastic melts is described, for example, in U.S. Pat. No. 3,926,706, the disclosure of which is incorporated in its entirety herein by reference.

In producing the laminates of the present invention, intended for bag structures in one particular application, it has been found that certain particularly desirable physical characteristics should be exhibited by the individual lamina. For example in bag constructions the outer layer, i.e. the outer layer constituting from 20% up to 40% of the overall laminate thickness, must be preferably stiff, i.e. have a relatively high tensile modulus; it must be tough, i.e. resistant to impact forces; it should exhibit good elongation under stress; and, finally, have a high degree of tear resistance particularly in the transverse direction of the layer, i.e. the direction which is transverse to the extrusion direction of that layer. The physical characteristics which are particularly desirable in the thicker interior laminar bag layer include ease of heat sealing over wide ranges of temperature and pressure; and a high degree of tear resistance particularly in the layers machine direction (direction of layer extrusion).

The degree orientation in each of the respective laminar layers is an important factor with respect to the overall physical properties of the laminate structure. It has been found that two types of orientation of the polymer crystallites occur in blown film extrusion by the trapped air method. The first type occurs by flow through the die lips and this orientation tends to align the crystallites in the direction of flow (MD). With a material completely amorphous in nature, this flow orientation has little or no effect, while there is an increasing amount of orientation in materials as the crystallinity increases. In a linear polymer with long, straight chains, the crystallites are oriented in the machine direction. With more branching of the chain, the crystallites tend to be in a somewhat more random orientation and these materials also contain more amorphous regions which do not orient. The orientation of high density polyethylene, since it is linear and more crystalline, thus is quite strong compared to low density polyethylene. From this die effect alone, the net result is a highly oriented film in the machine direction (MD) with little transverse direction (TD) orientation. In the progression from low density polyethylene to high density polyethylene, as the density increases and polymer branching decreases, the material is much more subject to orientation. High density polyethylene is highly oriented and thus tear in the transverse direction (TD) is very low.

It has been found that the second type of orientation in the blown film process is the blow-up ratio (BUR) effect. Since this stretching of the film pulls the bubble to larger diameters, the pull on polymer crystallites is multi-directional in nature and thus helps counteract the MD pull associated with the die effects. As BUR increases, TD orientation effects increase at some drop in MD properties. Tear, etc. thus can be increased in the normally week TD direction.

Low density polyethylene normally is run in the range of 1.5–3.0:1 blow-up ratio (circumference of the bubble: circumference of the annular die) in an attempt to balance the properties between machine direction (MD) and transverse direction (TD). In contrast high density polyethylene orients strongly in the machine direction due to the die effect, giving very poor TD properties at low density polyethylene type blow-ups and only gives balanced properties at 3–60:1 blow-up ratios. Economics and ease of handling the molten polymer strongly discourage such large blow-up ratios but tear is a key property in the bag type product. The present invention permits film to run at low density polyethylene rates and BUR conditions with the additional stiffness and strength of the high density polyethylene.

There is illustrated in the FIGURE one form of extrusion apparatus which may be employed to produce the laminar films of the present invention. As shown two thermoplastic extruders 11 and 12 feed dissimilar molten thermoplastic resins or blends of resins to common die member 13. Tubular extrusion die 13 has two concentric annular passages to separately accomodate and shape the individual resinous streams until they exit from concentric die orifices 14 and 14'. Shortly after emerging from orifices 14 and 14' the concentric, coaxial, molten or semi-molten tubes merge and become bonded together to form a two layered laminar tube 15. Air is provided (by conventional means not shown) to inflate and support tube 15 until tube 15 is collapsed downstream from die 13 by conventional counter-rotating collapsing rollers (not shown), i.e. a conventional entrapped air-bubble tubular extrusion process. The collapsed laminar tubing is subsequently passed to a wind-up station (not shown) or on to further processing, e.g. a bag making operation.

In practice, pelletized resinous materials to be fed to the extrusion system illustrated in the FIGURE is airveyed by a vacuum unloader from a supply source and fed to separate feeder tanks which are mounted above the individual extruders 11 and 12 illustrated in the FIGURE. Each of the resinous components in the blend compositions which are fed to extruder 11 (i.e., the extruder which supplies a molten resinous blend to die 13 to form outer layer 16) are volumentrically measured and dropped into a mixer located above extruder 11, the order of addition is not critical. The mixer is actuated at 120 RPM for approximately 15 seconds and then the premixed blend is fed to the extruder feed zone (not shown). For the primary extruder (i.e., extruder 12 which is employed to form the inner layer 17) only one resinous component, i.e. low density polyethylene is used as a feed material.

The primary extruder 12 which was employed in the following example comprised a 3½ inch diameter screw which was driven by a 125 HP motor. The screw had an L/D ratio of 24:1. The extruder barrel was a standard design and equipped with external jackets employed for the circulation of temperature control fluids therein and/or conventional electric resistance band heating elements positioned around the barrel.

The secondary extruder 11, i.e. that extruder which feeds molten resinous blend mixtures to die 13 to form outer layer 16 of the laminar structure, had a 2½ inch screw diameter and an L/D ratio of 20:1. The extruder barrel for extruder 12, was likewise equipped with hollow jackets for circulation therein of temperature control fluids and/or electrical resistance band heaters spaced along the length of the barrel to control the temperatures of the molten polymer inside the barrel.

Die 13, as shown in the FIGURE, is a coextrusion die with the primary extruder 12 feeding material which will eventually constitute layer 17 and secondary extruder 11 feeding material to die 13 which will eventually constitute outer layer 16. The annular die lips have approximately a 0.040 inch annular gap which form orifices 14 and 14' with a ¼ to 2 inch length angled lip section in the die so that the individual concentric tubes are separated as they exit from die 13 by approximately 1/32 inch. As a result of the separation, the film layers are joined above the die as illustrated in the FIGURE to form laminar tube 15.

Upon exit from die 13 the extruded concentric tubes 16 and 17 are oriented by internal air pressure trapped within the tube between the die 13 and the film collapsing nips (not shown) which inflates the tube to between 2 and 2.5 times the circumference of the die orifice diameters. This is essentially a conventional entrapped air bubble extrusion technique.

While the internally trapped air is stretching the film, a high velocity air stream supplied by air ring 18 as shown in the FIGURE, impinges in a generally vertical direction on the extruded tube to cool the molten polymer. The combination of internal air expansion and high velocity impingement of air from air ring 18 causes the layers to contract while still in the molten state and thereby forming a strong interfacial bond as the contacting layers cool and solidify.

Prior to passage of tube 12 to the nip rollers the formed film tube is conventionally collapsed by a frame of horizontally wooden slits located in an inverted V shape with the angle between the legs of the V approximately 30° to 35°. This V frame gradually flattens the film tube until, at the apex of the V, the tube is completely collapsed by the nip rollers which may consist of a rubber roll and a steel driven roller. The nip rollers function to draw the tube from the extrusion die 13 and also effect an air seal for the entrapped air bubble in the tube. Subsequent to passing the flatten tube through the nip rollers, the film is either wound into rolls or passed through bag making machinery or the like to form a finished product.

In the following Table I there is presented a listing of pertinent resin physical properties of the various polyolefin material which were employed in the succeeding examples.

TABLE I

Low Density Polyethylene Resin (For Inner Layer Polyethylene Component)

| Property | Value | ASTM Test Method |
|---|---|---|
| Melt Index, g/10 min | 2.25 | D-1238-65T |
| Density, g/cc | .921 | D-1505-68 |
| Tensile at Yield (20"/min),psi | 1510 | D-638-68 |
| Tensile at Break (20"/min),psi | 1688 | D-638-68 |
| Elongation at Break, % | 603 | D-638-68 |
| Elastic Modulus, psi | 24635 | D-638-68 |
| Stiffness in Flexure, psi | 800 | D-747-63 |
| Hardness, Shore D | D44 | D-2240-68 |
| Vicat Softening Point, °F. | 217 | D-1525-65T |
| Brittleness Temperature, °F. | below −105 | D-746-64T |

Low Density Fractional Melt Index, Polyethylene Resin (For Outer Layer Polyethylene Component)

| Property | Value | ASTM Test Method |
|---|---|---|
| Melt Index, g/10 min | 0.45 | D-1238-65T |
| Density, g/cc | 0.919 | D-1505-68 |
| Tensile at Yield (20"/min),psi | 1500 | D-638-68 |
| Tensile at Break (20"/min),psi | 2100 | D-638-68 |
| Elongation at Break, % | 750 | D-638-68 |
| Elastic Modulus, psi | 16,000 | D-638-68 |
| Stiffness in Flexure, psi | 17,000 | D-747-63 |
| Hardness, Shore D | 50 | D-2240-68 |
| Vicat Softening Point, °F. | 212 | D-1525-65T |
| Brittleness Temperature, °F. | below −105 | D-746-64T |

High Density Polyethylene Resin

| Property | Value | ASTM Test Method |
|---|---|---|
| Melt Index, g/10 min | 0.35 | D-1238 |
| Density, g/cc | 0.963 | D-1505 |
| Tensile Yield | | D-638 |
| lbf/in² | 4100 | |
| kgf/cm² | 288 | |
| Elongaton, % | 800 | D-638 |
| Flexural Modulus | | D-790 |
| lbf/in² | 205,000 | |
| kgf/cm² | 14,400 | |
| Hardness, Shore D | 70 | D-1706 |
| Izod Impact, ft lbf/in of notch | 6.9 | D. 256 |
| Tensile Impact | | D-1822 |

TABLE I-continued

| | | |
|---|---|---|
| ft lbf/in² | 60 | |
| cm kgf/cm² | 128 | |
| Brittleness Temperature, °C. | <−70 | D-746 |
| Vicat Softening Point | | D-1525 |

Physical Properties of Ethylene Vinyl Acetate Copolymer Resin Component (Outer Layer Blend - Examples I and III)

| Property | Ex. I | Ex. III | ASTM Test Method |
|---|---|---|---|
| % VA | 18 | 6 to 8 | — |
| Melt Index, (g/10 min.) | 0.7 | 0.45 | D-1238 |
| Stiffness psi (kg/cm²) | 4,500 320 | 16,000 | D-747 |
| Vicat Softening Point, °F. | 142 | 212 | D-1525 |

Physical Properties of High Density Polyethylene - Octene Copolymer Resin

| Property | Value | ASTM Test Method |
|---|---|---|
| Melt Index | 0.45 | D-1238 |
| Density | 0.950 | D-1505 |
| Molecular Weight | — | — |
| % by Weight Octent | 3.0 | — |

The details and manner of producing the laminar tubular structures of the present invention will be apparent from the following specific examples, it being understood, however, that they are merely illustrative embodiments of the invention and that the scope of the invention is not restricted thereto.

In the subsequent examples the apparatus which was actually used to form the multi-wall thermoplastic tubing corresponded essentially to that shown in the FIGURE of the drawing. Also, the resinous material employed in the following examples had the physical properties as outlined in preceding Table I.

EXAMPLE 1

A dual wall tubular thermoplastic film laminate averaging 1.5 mils in thickness, the inner wall being formed from the low desnity polyethylene hereinbefore defined and the outer wall being formed from a blend of high density polyethylene, ethylene vinyl acetate copolymer containing 18 percent vinyl acetate by weight, and low density fractional melt index polyethylene hereinbefore defined was prepared by melt extruding 100 parts by weight of low density polyethylene resin through extruder 12 and concurrently melt extruding from extruder 11 a resinous blend mixture comprising 75 percent by weight high density polyethylene, 12.5 percent by weight of ethylene vinyl acetate copolymer (18 percent VA), and 12.5 percent by weight of the fractional melt index, low density polyethylene. The respective molten layers assumed an annular configuration as they flowed through die 13. The molten tubes exit from die 13 as concentric tubes through orifices 14 and 14' whereupon they subsequently merged together to form the laminar tube 15 as shown in the FIGURE. The extruder processing conditions including pressures, temperatures and die orifice dimensions employed for this, and the following example, are set forth in subsequent Table II which also includes data on the physical properties of the multi-wall extruded film produced. No separation of the two layers occured when the resultant laminar film was repeatedly flexed. The low density polyethylene layer of the laminar film constituted approximately 79 to 80% of the overall thickness of the laminate.

EXAMPLE 2

A dual wall tubular thermoplastic film laminate averaging 1.5 mils in thickness, the inner wall being formed from the low density polyethylene hereinbefore defined and the outer wall being formed from a blend of a high density polyethylene-octene copolymer and low density, fractional melt index polyethylene hereinbefore defined was prepared by melt extruding 100 parts by weight of low density polyethylene resin through extruder 12 and concurrently melt extruding from extruder 11 a resinous blend mixture comprising 80 percent by weight of the high density polyethylene-octene copolymer and 20 percent by weight of the fractional melt index low density polyethylene. The respective molten layers assumed an annular configuration as they flowed through die 13. The molten tubes exit from die 13 as concentric tubes through orifices 14 and 14' whereupon they subsequently merged together to form laminar tube 15 as shown in the FIGURE.

EXAMPLE 3

A dual wall tubular thermoplastic film laminate averaging 1.5 mils in thickness, the inner wall being formed from the low density polyethylene hereinbefore defined and the outer wall being formed from a blend of high density polyethylene and ethylene vinyl acetate copolymer containing 6–8 percent vinyl acetate by weight, hereinbefore defined was prepared by melt extruding 100 parts by weight of low density polyethylene resins through extruder 12 and concurrently melt extruding from extruder 11 a resinous blend mixture comprising 70 percent by weight high density polyethylene, hereinbefore defined, and 30 percent by weight of ethylene vinyl acetate copolymer (6 to 8 percent VA). The respective molten layers assumed an annular configuration as they flowed through die 13. The molten tubes exit from die 13 as concentric tubes through orifices 14 and 14' whereupon they subsequently merged together to form the laminar tube 15 as shown in the FIGURE. The extruder processing conditions including pressures, temperatures and die orifice dimensions employed for this, and the preceding examples, are set forth in subsequent Table II which also includes data on the physical properties of the multi-wall extruded film produced. No separation of the two layers occurred when the resultant laminar film was repeatedly flexed. The low density polyethylene layer of the laminar film constituted approximately 80 percent of the overall thickness of the laminate.

TABLE II

| Example No. | | I | II | III |
|---|---|---|---|---|
| Extruder 12: (inner layer) | | | | |
| Barrel Dia. (in.) | | 3.5" | 3.5" | 3.5" |
| Screw RPM | | 70 | 63 | 63 |
| Barrel Temp., ° F. (5 zones) | | 300,300,300,300,350 | 300,350,350,350,380 | 300,350,350,350,380 |
| Plastic Melt Temp., ° F. | | 396 | 415 | 418 |
| Plastic Melt Press. (psi) | | 5650 | 5700 | 6200 |
| Extruder 11: (outer) | | | | |
| Barrel Dia. (in.) | | 2.5" | 2.5" | 2.5" |
| Screw RPM | | 32 | 35 | 39 |
| Barrel Temp., ° F. (4 zones) | | | 300,350,380,380 | 270,350,380,380 |
| Plastic Melt Temp., ° F. | | 427 | 445 | 435 |
| Plastic Melt Press. (psi) | | 4400 | 5650 | 5090 |
| Die 13: | | | | |
| Temp., ° F. (4 zones) | | 320 all zones | 320 all zones | 320 all zones |
| Orifice Dia. (in.) | | 9⅜" | 9⅜" | 9⅜" |
| Orifice Width (in.) outer | | .040 | .040 | .040 |
| inner | | .040 | .040 | .040 |
| Tubular Film: | | | | |
| Layflat Width (in.) | | 37" | 37" | 37" |
| Wall Thicknesses (mils) | | | | |
| Inner Wall | | 1.2 mil | 1.2 mil | 1.2 mil |
| Outer Wall | | 0.3 mil | 0.3 mil | 0.3 mil |
| Example No. | | I | II | III | ASTM Test Methods |
| Film- Physical Properties: | | | | | |
| Modulus | MD (PSI) | 41,295 | 40,217 | 45,108 | 90T-10 Modified |
|  | TD | 54,295 | 55,582 | 64.317 | (D882) |
| Yield | MD | 1,566 | 1,510 | 1,558 | 90T-15 (D882) |
|  | TD | 1,590 | 1,611 | 1,635 | |
| Ultimate | MD | 2,857 | 3,228 | 2,949 | 90T-15 (D882) |
|  | TD | 1,875 | 2,113 | 2,000 | |
| Toughness | MD | 771 | 875 | 686 | 90T-15 (D882) |
|  | TD | 767 | 898 | 814 | |
| Elongation | MD | 389 | 409 | 329 | 90T-15 (D882) |
|  | TD | 593 | 658 | 624 | |
| Puncture lbs. | | 9.10 | 9.75 | 8.25 | 90P-20 Modified |
| Tear | MD | 334 | 407 | 246 | 90E-01 (D1922) |
| (Elmendorf initiated) | TD | 295 | 438 | 313 | |
| Dart (Impact) | | 44 | 55 | 48 | 90I-01.1 (D1709) |

As hereinbefore described the laminar film tube produced in accordance with Example 1 has an outer layer comprising a resinous blend of high density polyethylene, ethylene vinyl acetate copolymer, and fractional melt index low density polyethylene. It has been found that this combination of resins present in the exterior layer improves the performance of bag structures fabricated from such films. Specifically, it improves the characteristics in contrast to a single layer bag of low density polyethylene of equivalent gauge. The high density polyethylene present in the outer layer improves the stiffness or tensile modulus of elasticity of such structures which in turn facilitates handling of the bag. Due to the differential in melting temperatures between the laminar layers, thinning out of the film during heat sealing operations is reduced significantly as composed to single layer film thin-out during heat sealing. The ethylene vinyl acetate copolymer moiety present in the external layer increases the resistance to splittiness in or adjacent to heat seal areas which splittiness is characteristic of low density polyethylene. Additionally it improves the puncture resistance and toughness of the bag structure. The presence of the fractional melt index low density polyethylene in the outer layer blend has been found to increase the laminates resistance to tearing in the machine direction, i.e. the direction in which the film was extruded. The fractional melt index low density polyethylene also serves to increase the tensile modulus of the bag in order to remedy the decrease in tensile modulus caused by the presence of the ethylene vinyl acetate in the blend.

The laminar structure produced in accordance with Example 2, when fabricated into bag structures, improves the performance characteristics of such a bag when contrasted to bags of equivalent gauge formed from a single-layer, low density polyethylene film. The presence of the high density polyethylene-octene copolymer in the outer bag layer improves the tensile modulus as well as the toughness of the bag when contrasted to the 100 percent single-layer, low density polyethylene bag. The presence of the fractional melt index low density polyethylene in the bag structure of Example 1 improves the resistance to tear of such bags as well as the puncture resistance characteristics of the bag.

Although the present invention has been described with preferred embodiments, it is to be understood that modifications and variations may be resorted to, without departing from the spirit and scope of this invention, as those skilled in the art will readily understand. Such modifications and variations are considered to be within the purview and scope of the appended claims.

What is claimed is:

1. A laminar film structure comprising at least one layer of low density polyethylene resin and a second layer comprising a resinous blend of a member selected from the group consisting of:
   (a) high density polyethylene, ethylene vinyl acetate copolymer having from about 6% by weight up to about 18% by weight of vinyl acetate and low density polyethylene;
   (b) high density polyethylene-octene copolymer and low density polyethylene; or
   (c) high density polyethylene and a non-saponified ethylene vinyl acetate copolymer having a vinyl acetate content of from about 6% by weight up to about 18% by weight.

2. A laminar thermoplastic bag structure comprising at least two layers, an inner layer and an outer layer, said inner layer comprising low density polyethylene and said outer layer comprising a film formed from a resinous blend of a member selected from the group consisting of:
   (a) high density polyethylene, ethylene vinyl acetate copolymer having from about 6% by weight up to about 18% by weight of vinyl acetate and low density polyethylene;
   (b) high density polyethylene-octene copolymer and low density polyethylene; or
   (c) high density polyethylene and a non-saponified ethylene vinyl acetate copolymer having a vinyl acetate content of from about 6% by weight up to about 18% by weight.

* * * * *